(12) United States Patent
Shibayama et al.

(10) Patent No.: US 7,898,458 B2
(45) Date of Patent: Mar. 1, 2011

(54) DISASTER COUNTERMEASURE SUPPORT METHOD

(75) Inventors: Takashi Shibayama, Meguro-ku (JP);
Takashi Nonaka, Meguro-ku (JP);
Yoichi Sugimoto, Meguro-ku (JP)

(73) Assignee: Pasco Corporation, Tokyo (JP)

( * ) Notice: Subject to any disclaimer, the term of this patent is extended or adjusted under 35 U.S.C. 154(b) by 92 days.

(21) Appl. No.: 12/375,856

(22) PCT Filed: Aug. 3, 2007

(86) PCT No.: PCT/JP2007/065305
§ 371 (c)(1),
(2), (4) Date: Jan. 30, 2009

(87) PCT Pub. No.: WO2008/016153
PCT Pub. Date: Feb. 7, 2008

(65) Prior Publication Data
US 2009/0256741 A1    Oct. 15, 2009

(30) Foreign Application Priority Data
Aug. 3, 2006   (JP) .............................. 2006-212669

(51) Int. Cl.
*G01S 13/00*   (2006.01)

(52) U.S. Cl. .................. 342/25 A; 342/25 C; 342/179; 342/191

(58) Field of Classification Search ................ 342/25 R
See application file for complete search history.

(56) References Cited

U.S. PATENT DOCUMENTS

2002/0041328 A1 *   4/2002   LeCompte et al. .......... 348/144

FOREIGN PATENT DOCUMENTS

JP    2005 284539    10/2005

OTHER PUBLICATIONS

Okhura, H., "Application of SAR data to monitoring earth surface changes and displacement", 1998, advances in space research, vol. 21 issue 3, pp. 485-492.*

Ohkura, H., "Applicability and Operational Criteria of ALOS for Natural Disaster Reduction", IEEE 2000 International Geoscience and Remote Sensing Symposium, IGARSS 2000, vol. 6, pp. 2417-2419, (2000).

(Continued)

*Primary Examiner* — Thomas H Tarcza
*Assistant Examiner* — Timothy A Brainard
(74) *Attorney, Agent, or Firm* — Oblon, Spivak, McClelland, Maier & Neustadt, L.L.P.

(57) ABSTRACT

A ground surface as an image acquiring object is acquired by a synthetic aperture radar mounted on an artificial satellite at a usual time before occurrence of a disaster and thereby radar image data are obtained. After the occurrence of the disaster, an image of the ground surface as the image acquiring object is acquired within days shorter than the number of orbit returning days and by comparing this radar image data with the radar image data acquired at the usual time so as to try to early grasp a damaged situation. At a recovering and rebuilding time after the occurrence of the disaster, images of the image acquiring object are periodically acquired so as to prepare a recovering and rebuilding plan and prevent secondary disasters.

8 Claims, 5 Drawing Sheets

OTHER PUBLICATIONS

Arakida, M., "ALOS Rapid Response System", Asian Disaster Reduction Center, (2006) (with English Translation).

Koarai, M. et al., "Topographical Mapping Using ALOS Satellite Imagery", IEEE 2000 International Geoscience and Remote Sensing Symposium, IGARSS 2000, vol. 6, pp. 2406-2408, (2000).

Huadong, G. et al., "Study of Environmental Issues With Alos Palsar Data", IEEE2002 International Geoscience and Remote Sensing Symposium, vol. 1, pp. 396-398, (2002).

"Chikyu o Mawaru Ohoshisama", Japan Aorospace Exploration Agency ALOS Project Team, 2007 (with English Translation).

* cited by examiner

DISASTER COUNTERMEASURE SUPPORT METHOD

TECHNICAL FIELD

The present invention relates to a systematic disaster countermeasure support method performed at a usual time before occurrence of a disaster, at an emergency countermeasure time after occurrence of a disaster, and at a recovering and rebuilding time using a radar device that is mounted on a flying object such as an artificial satellite, acquires images of a wide range of a ground surface as an image acquiring object area, and detects a situation of a ground surface.

BACKGROUND ART

When a disaster such as an earthquake, a typhoon, or a fire occurs, a method of performing a field survey and checking up its damaged situation has been traditionally performed by a staff of a local government and so forth. In this method, it is difficult to grasp an overall image of a wide damaged area. In addition, since people go in the damaged area for rescue activities and so forth, it is highly likely that a secondary disaster occurs. To solve such a problem, along with such a method, another method of using a sensor that is mounted on an airplane to grasp the damaged situation has been performed.

After occurrence of a disaster, emergency countermeasures are performed against the disaster by the staff of the local government under the direction of specialists of the central government and relevant organizations. During that, aerial photographs are acquired by an airplane and the damaged situation is grasped by a field survey. Thereafter, if necessary, a support staff is requested to be sent from other prefectures and so forth and various recovering and rebuilding works are carried out based on the damaged situation.

For example, Japanese Unexamined Patent Application Publication No. 2005-284539 issued by Japan Patent Office proposes an automatic damaged area extracting system that automatically extracts damaged areas of a natural disaster and a disaster caused by a person (people) using image data acquired by an artificial satellite, an airplane, and so forth.

So far, an artificial-satellite-mounted sensor or an airplane-mounted-sensor has acquired images after occurrence of a disaster, not has performed periodical monitoring (supervisory activities) at a usual time to mitigate disasters. Thus, disaster-prone areas (having risk of occurrence of disasters) have not been extracted at the usual time by causing an artificial-satellite-mounted sensor or an airplane-mounted-sensor to acquire images. As a result, there was a problem that after occurrence of a disaster, it took a time to identify accurate areas where it likely occurred.

On the other hand, when an airplane-mounted-sensor was used to acquire images of a damaged area, there was a problem that images of only a limited area were acquired, it was difficult to grasp the situation of a wide area because of its characteristics, and thereby it took a longer time as the damaged area widened. In addition, it was difficult to periodically acquire images of a damaged area after occurrence of the disaster, there was a problem that it was difficult to accurately grasp a recovering and rebuilding situation and so forth.

The related art reference described in the foregoing Japanese Unexamined Patent Application Publication No. 2005-284539 only automatically extracts a damaged area, not mentions emergency countermeasures after occurrence of a disaster, in particular, support activities at a recovering and rebuilding time.

Thus, in the traditional methods, countermeasure planning, activities, and so forth were not able to be accurately, quickly, and systematically performed at the usual time, at the emergency countermeasure time after occurrence of the disaster, and at the recovering and rebuilding time.

The present invention was made from the foregoing point of view and an object of which is to propose a disaster countermeasure support method of accurately, quickly, and systematically performing countermeasure planning, activities, and so forth at the emergency countermeasure time after occurrence of a disaster and at the recovering and rebuilding time.

DISCLOSURE OF THE INVENTION

The present invention is a disaster countermeasure support method of causing a radar device mounted on an artificial satellite having a predetermined number of orbit returning days to acquire radar image data of an image acquiring object over a period including an emergency countermeasure time after occurrence of a disaster and a recovering and rebuilding time and causing a data analysis device to use the radar image data obtained as a result of image acquiring to provide desired information, the radar device acquires an image of the image acquiring object from one of a plurality of orbits of the satellite after the occurrence of the disaster and obtain the radar image data such that the image acquiring object is acquired in days shorter than the predetermined number of orbit returning days, the data analysis device to receive the radar image data acquired after the occurrence of the disaster from the radar device, the data analysis device extracts a change region from a difference of image data containing the image acquiring object and pre-generated at the usual time and radar image data acquired after the occurrence of the disaster and create a change extraction chart at the emergency countermeasure time from the extracted change region, the radar device periodically obtains the radar image data of the image acquiring object after obtaining the radar image data acquired after the occurrence of the disaster, the data analysis device obtains the radar image data periodically acquired after the occurrence of the disaster from the radar device, the data analysis device extracts a change region from a difference of the radar image data acquired after the occurrence of the disaster and the radar image data periodically acquired after the occurrence of the disaster and create a change extraction chart at the recovering and rebuilding time from the extracted change region.

According to the foregoing structure, information that contributes to mitigate disasters can be obtained from image data containing information of a ground surface at the usual time before occurrence of a disaster. In addition, after occurrence of the disaster, by periodically acquiring images, they can be used to make a recovering and rebuilding plan and prevent secondary disasters.

According to the present invention, countermeasure planning and activities can be accurately, quickly, and systematically performed at the emergency countermeasure time after occurrence of a disaster and at the recovering and rebuilding time.

BEST MODES FOR CARRYING OUT THE INVENTION

Next, with reference to the accompanying drawings, best modes for carrying out the present invention will be described.

Figure 1:
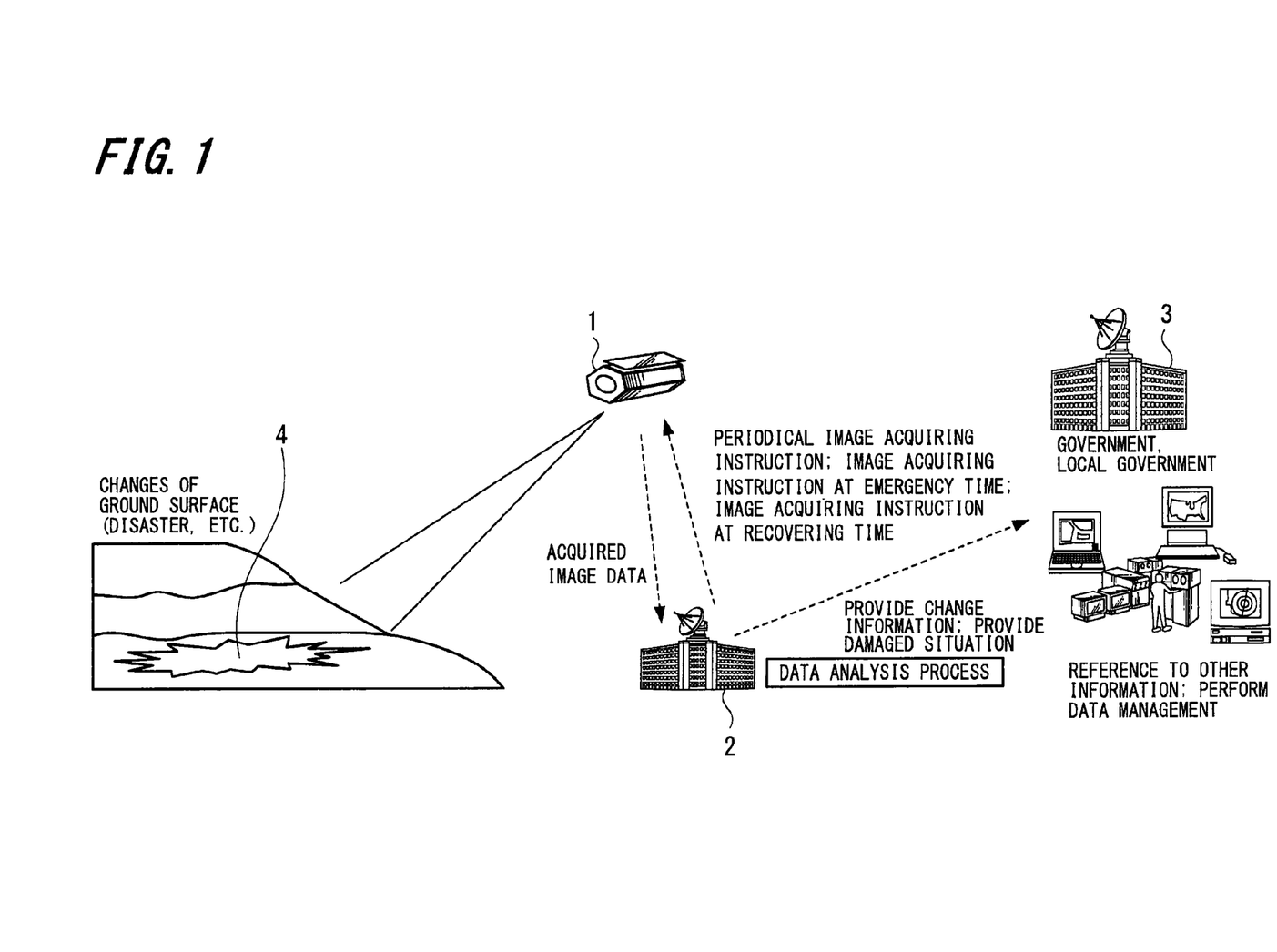
FIG. 1 is a schematic diagram showing an outline of a disaster countermeasure support system according to an embodiment of the present invention.

FIG. 1 is a schematic diagram showing an outline of a disaster countermeasure support system carried out by a disaster countermeasure support method according to the present invention. In the disaster countermeasure support system shown in FIG. 1, changes of a ground surface as an image acquiring object are acquired as images by an satellite-mounted-sensor (radar device) and the acquired image data or those that that have been processed can be used to take countermeasures against a disaster (countermeasure planning and real activities). As will be described later, using a feature of this disaster countermeasure support system that periodically obtains radar image data by an satellite-mounted-sensor, desired data are provided in three phases before and after occurrence of a disaster.

In this embodiment, a synthetic aperture radar (SAR) as a radar device is mounted on a satellite and images of a ground surface are acquired thereby. The synthetic aperture radar is an active type sensor that measures the reflection of radio waves (pulses of microwaves) irradiated from the satellite. The synthetic aperture radar can two-dimensionally acquire images of a wide range of a ground surface regardless of day/night and weather using characteristics of microwaves. Hereinafter, an synthetic aperture radar mounted on an satellite is referred to as "a satellite SAR".

While circling a predetermined orbit, a satellite SAR 1 acquires images of a ground surface periodically or according to a command and transmits radar image data that contain changes of the ground surface due to a disaster or the like to a ground data analysis center 2.

The data analysis center 2 performs periodical image acquiring planning at the usual time, image acquiring planning at the emergency countermeasure time, and image acquiring planning at the recovering and rebuilding time and transmits information about image acquiring commands to the satellite SAR 1 based on the image acquiring planning. Radar image data acquired by the satellite SAR 1 are received through an antenna. A data analysis device performs a synthetic aperture process for the received data, generates reproduced images, and performs a difference process and so forth for the obtained images to analyze changes of the ground surface. The data analysis center 2 provides the change information of the ground surface that represents a damaged situation as the analyzed result to an administrative organ 3 such as the central government or a local government.

The foregoing data analysis device includes a radar image data database (radar image data storage section) that stores image data that were acquired in the past (acquired image data), a threshold database that stores thresholds referred when the change detection process is performed (threshold storage section), a difference calculation section that calculates characteristic values (differences of scattering intensities, displacement amount of ground) of individual pixels of data of two radar images that are different in image acquiring times, and the change detection section that compares the difference obtained by the difference calculation section with a predetermined threshold and extracts a pixel or a set of pixels having a signal component that satisfies a condition as a change area. Thresholds are fixed values predetermined by a threshold setup section or variable values defined for each image acquiring).

The radar image data in this case are time series image data obtained by a radar device at different times. In addition, each section of the foregoing data analysis device is accomplished by an arithmetic processing unit and an operation program. For example, each section of the data analysis device is accomplished by causing a computer (arithmetic processing unit) to execute a predetermined operation program stored in a storage medium.

The administrative organ 3 refers (correlates) change information of the ground surface that represents a damaged situation transmitted from the data analysis center 2 to (with) another information such as meteorological information and information of seismometers to perform a data management. The result of the data management performed by the administrative organ 3 is effective to perform disaster prevention countermeasures, emergency countermeasures after occurrence of a disaster, and plan and execute countermeasures and so forth at the recovering and rebuilding time.

Figure 2:
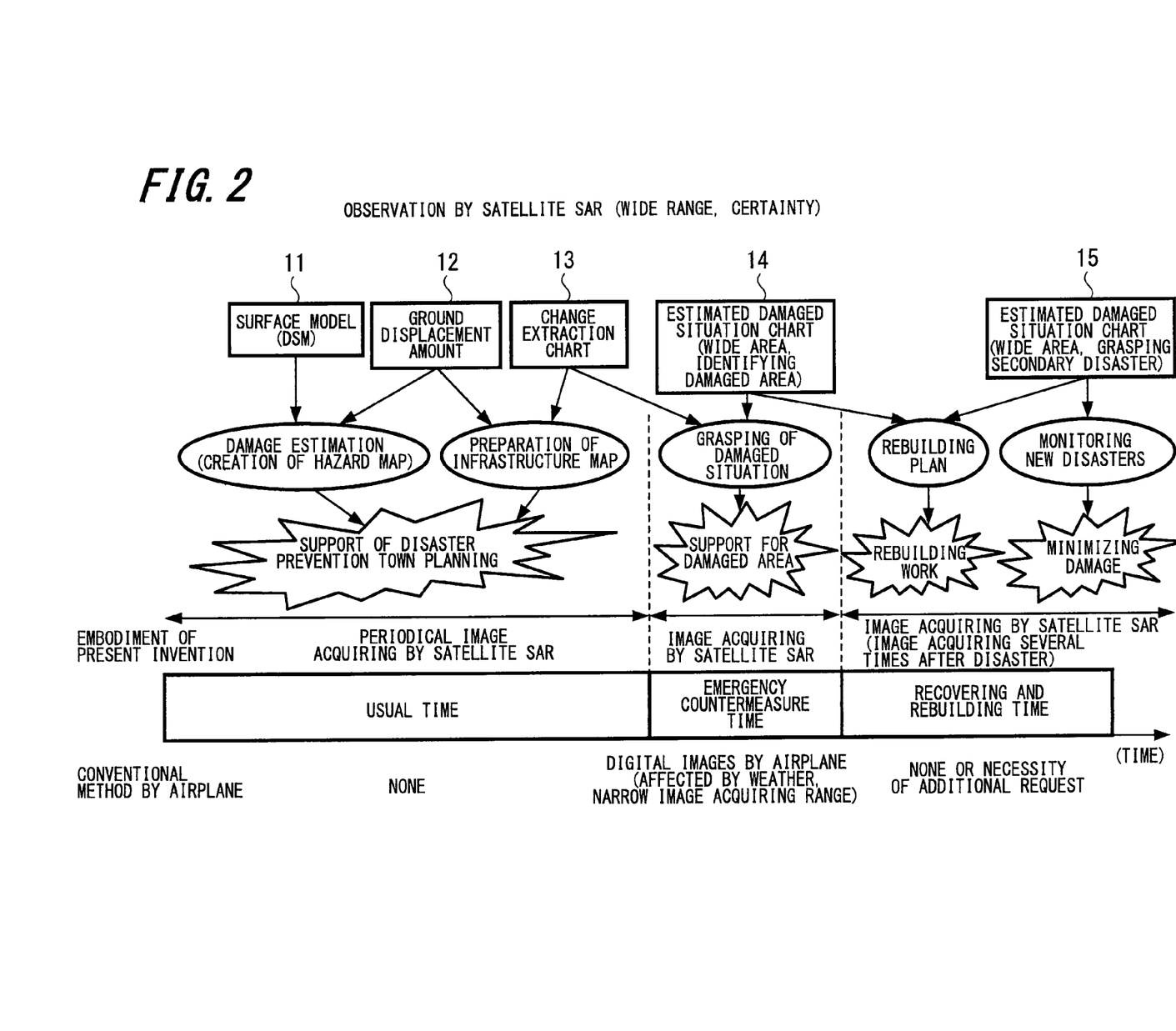
FIG. 2 is a schematic diagram describing a flow from the usual time, to the emergency countermeasure time, to the recovering and rebuilding time according to this embodiment of the present invention.

Next, with reference to FIG. 2, a flow of a process of the foregoing disaster countermeasure support system at the usual time, at the emergency countermeasure time, and at the recovering and rebuilding time will be described. In FIG. 2, uppermost four-angle-framed items are portions for which images of the ground surface are acquired and an estimated damaged situation chart is created based on changes of the acquired images, mainly performed by a private company such as a surveying company. Lower star-framed items are portions for which a disaster prevention town planning support and a rebuilding support are performed mainly by administrative organs (local government and so forth). Intermediate ellipse-framed items are portions for which basic data necessary to perform the disaster prevention town planning support and the rebuilding support are created based on changes of the ground surface in principle by administrative organs, but these items may be created by a contracted private company.

As described above, conventionally, at the usual time, aerial photograph acquiring using an airplane was not performed for prevention against disasters. After a disaster occurred, images of the ground surface were obtained by aerial photograph acquiring using a airplane-mounted-sensor. However, there were problems that images of the ground surface were not acquired because of cloud (smoke in the case of a volcano) (when an optical sensor was used), the image acquiring range was narrow, an airplane was not able to be used in a bad weather. In addition, usually, at the recovering and rebuilding time, aerial photograph acquiring by an airplane was not performed. Instead, the administrative organ 3 needed to request an aerial surveying company having an airplane to do so. Instead, the administrative organ 3 needed to have a previous image acquiring agreement with such a company.

In contrast, since the disaster countermeasure support system according to this embodiment acquires images of the ground surface using the satellite SAR 1, images of the ground surface can be securely and widely acquired without an influence of weather.

First, at the usual time, images of the ground surface are periodically acquired from the satellite SAR 1 that circles a predetermined orbit. For example, images are acquired periodically around once every three to six months such that changes (land use and covering changes) are extracted from obtained radar image data and the displacement amount of the ground are two-dimensionally calculated. In addition, a surface model (digital surface model DSM) is created. All data or a part of data of a surface model 11, a ground displacement amount 12, and a change extraction chart 13 are provided as products (information) to mitigate disasters and are used for disasters prevention town planning performed by the administrative organ 3 while it estimates an damage and prepares an infrastructure map.

The administrative organ 3 or the data analysis center 2 creates a damage estimation chart (hazard map) using the surface model 11 and/or the ground displacement amount 12. In addition, the administrative organ 3 or the data analysis center 2 prepares an infrastructure map of an image acquiring object area using the ground displacement amount 12 and/or the change extraction chart 13. While creating these damage estimation chart and/or preparing the infrastructure map, disaster prevention town planning performed by the administrative organ 3 is indirectly supported.

The surface model 11 is used as surface information when an estimated disaster is simulated (for example, a flood simulation). With the surface model 11, a hazard map and so forth are created and used as a basic material for evaluating so-called countermeasures by software such as residents' awareness raising against disasters and so-called countermeasures by hardware such as construction of banks at the usual time. Thus, countermeasures of mitigating disasters can be implemented at the usual time. The surface model 11, namely information about the altitude and displacement of the ground surface, can be obtained from a phase difference of interference of data of two radar images (data acquired by a synthetic aperture radar) of the same image acquiring object.

The ground displacement amount 12 is obtained by comparing data of two radar images acquired at two different times and represents an area and amount where and how the ground has displaced (sank). Like the forgoing surface model 11, the ground displacement amount 12 can be used to estimate a flood damage upon occurrence of a flood and create a hazard map. Thus, disaster-prone areas can be monitored and countermeasures to mitigate disasters can be performed at the usual time. In addition, the ground displacement amount 12 can be used to prepare an infrastructure map.

The change extraction chart 13 extracts land use changes due to development of residential sites and disaster-prone areas also taking account of even minor disasters and provides superimposed information of changes and a map. Thus, before a major disaster occurs, since the change extraction chart 13 can be associated with activities, for example, of required countermeasures, the change extraction chart 13 can be effectively used to mitigate the damage in a major disaster. The change extraction chart 13 can be also used to prepare an infrastructure map.

Since images of an area are periodically acquired and stored as a database, the latest state of the area can be always grasped. If a disaster occurs, the stored images are compared with images acquired by the satellite SAR 1 and areas that have changed after the disaster are supposed to be damaged areas. As a result, damaged areas can be quickly estimated.

It is preferred that image acquiring be performed in as different conditions (orbits of satellite, seasons, times, resolutions, polarizations, and so forth) as possible at the usual time so as to secure immediate response upon occurrence of a disaster.

At the emergency countermeasure time after occurrence of a disaster, images of disaster-suspicious areas are acquired as early as possible. In this case, at the usual time, it may be contemplated that images of disaster-prone areas may be acquired with a high priority. Instead, if images of high population urban areas (prefectural capitals and so forth) are acquired with a high priority by limiting image acquiring objects, an immediate response against a disaster may be improved. When a acquired image is compared with the latest pre-disaster data or data having similar image acquiring condition, an estimated damaged situation chart can be quickly provided. At this point, time for provision and provision for wide area information may be prioritized and accuracy (correction of erroneous extraction, and so forth) may be considered in the next phase, namely at the recovering and rebuilding time preceded by the emergency countermeasure time.

By periodically and successively evaluating (acquiring images of) damaged areas based on a wide, two-dimensional, and consistent criterion, if a disaster occurs, a damaged situation can be quickly grasped and an appropriate support can be performed against the disaster. In addition, the foregoing periodic and successive image acquiring may become effective information in the recovering and rebuilding work and planning that are performed thereafter.

Even at the recovering and rebuilding time after the emergency countermeasure time, image acquiring is periodically performed by the satellite SAR 1. For example, if a large earthquake occurs, relatively large aftershocks may occur in a certain period although it depends on a disaster's type, situation, or the like. Thus, in such a period, image acquiring is performed several times at as short intervals as possible, an estimated damaged situation chart is created, and information about areas where damages have increased due to aftershocks or the like is provided.

In addition, information about areas where traffic disturbance such as a road obstruction and a bridge collapse has occurred is provided to support the administrative organ 3 such that it can appropriately decide bypass roads and so forth when it investigates a damaged situation in detail. Instead, by periodically acquiring images of areas where a river channel obstruction and a bank breach have occurred and grasping a damage's progress (or monitoring a new damage), the damage can be effectively minimized, for example, secondary disasters can be prevented.

After a time has elapsed, over a period after the recovering and rebuilding time until the usual time, namely after a risk in which a direct damage occurs becomes low, image acquiring is periodically continued. For example, by comparing an estimated damaged situation chart after occurrence of a disaster and that at the recovering and rebuilding time, monitoring a restoring situation (work progress) of social infrastructure and so forth according to the rebuilding plan, and providing the information to the local government, the administrative organ 3 can review the rebuilding plan at any time and thereby the damaged areas can be rebuilt quickly.

Next, with reference to a flowchart of FIG. 3, the change detection process that creates the change extraction chart 13 (estimated damaged situation charts 14, 15) will be described.

Figure 3:
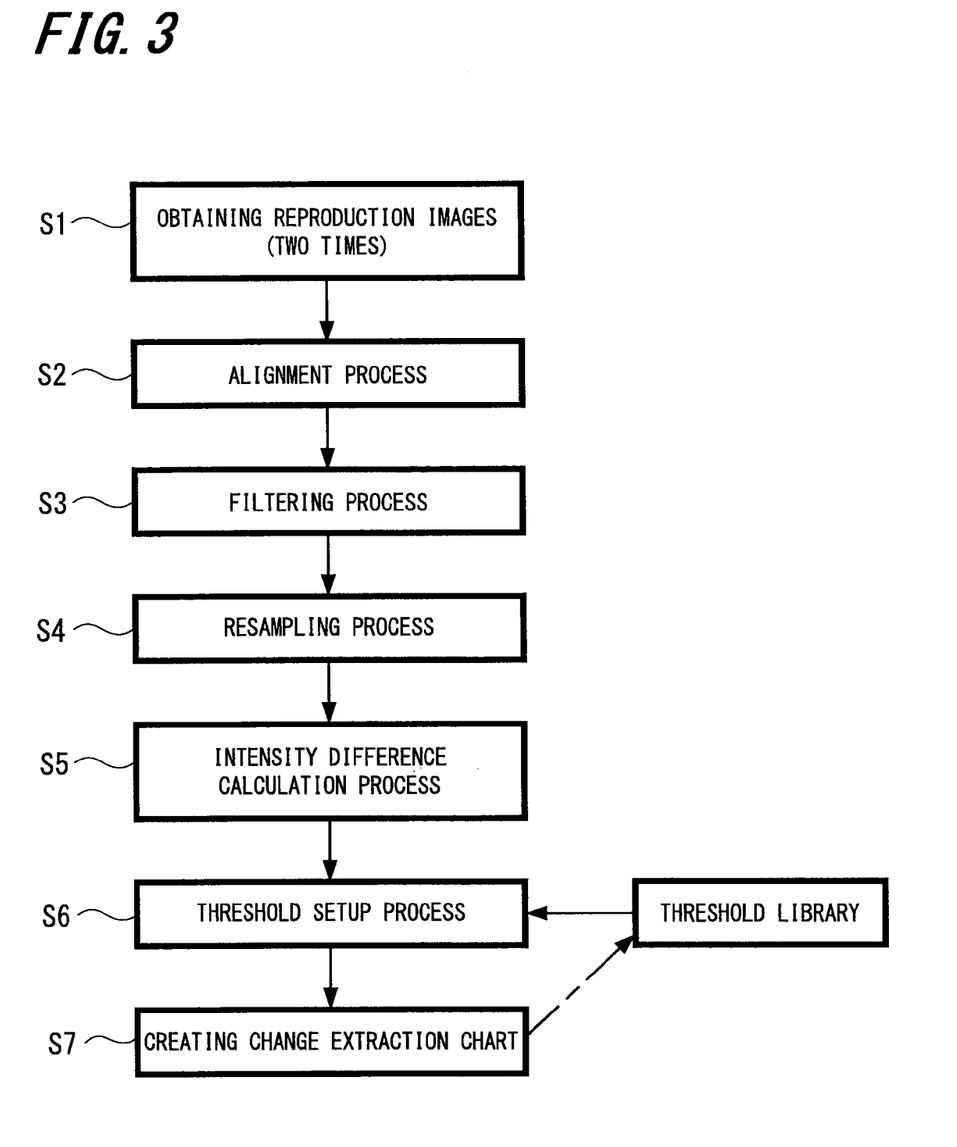
FIG. 3 is a flowchart showing a change detection process according to this embodiment of the present invention.

In FIG. 3, the data analysis device obtains reproduction images from data of a plurality of radar images of the same image acquiring object that are backscatter intensities and correlation indexes such as coherence and height information obtained at different times and stores them in a radar image data storing section (at step S1). The height information can be accurately obtained by an interferometry process using respective synthetic aperture radars that have the same image acquiring specifications and mounted on a plurality of satellites. In this case, the reproduction images are not necessary to be re-constructed data (reproduction images) unlike the case that backscatter intensities and correlation indexes are used. Instead, a digital surface model (DSM) that is height information in predetermined coordinates may be directly stored. In an alignment process, data of the foregoing plurality of radar images are read from a radar image data storage section and data of each of radar images are aligned (at step S2).

The data of the aligned radar images are noise-eliminated by a filtering process (at step S3) and then their pixel size is changed to an appropriate pixel size by a re-sampling process (at step S4). Thereafter, the difference of a plurality of characteristic values (scatter intensities, ground displacement amounts, and so forth) that represent the state of the ground surface to be image-acquired. The difference of the characteristic values is calculated, for example, by a difference calculation section that calculates the difference of the backscatter intensities of the foregoing microwaves (at step S5). In this example, as an example of the change detection process, the difference of scatter intensities was described. Instead, the difference of correlation indexes such as coherence or the difference of digital surface models (DSMs) may be calculated.

The threshold database has stored a threshold library creased based on relationship of past detected change results, regional characteristics and image acquiring conditions of image acquiring objects with thresholds. With reference to the threshold library, the threshold setup section sets up an appropriate threshold with which changes are detected (at step S6). The change detection section compares the threshold that has been set up by the threshold setup section with the difference obtained by the difference calculation section, extracts a change region of the image acquiring object, combines information of the change region and map information, and creates a change extraction chart (at step S7).

By feeding back the created change extraction chart and information about the real damaged situation, the recovering and rebuilding progress, and so forth to the threshold library, the threshold setup section can set up a proper threshold according to the situation. Next, an example in which various types of information are reflected to parameters such as thresholds will be described.

Taking into account of grasping of a damaged situation, a method of shortening time necessary to start image acquiring can be contemplated. For example, using any one of a plurality of orbits of satellites that can acquire images of an image acquiring object, images can be reacquired after an elapse of days (for example, three days) shorter than the number of orbit returning days. Thus, since time after occurrence of a disaster until radar image data are obtained can be shortened, the damaged situation can be more early grasped.

Instead, assuming that a pixel size is a kind of a threshold, a method of selecting a pixel size used in an image process according to changes of the ground surface to be extracted may be contemplated. There is a relationship of a tradeoff in which when the pixel size is small, although minor changes can be detected, since the whole situation is not seen, erroneous extractions may occur and when the pixel size is enlarged, although a decision can be made since the whole situation is seen, minor changes may be overlooked. Thus, the selection of an appropriate pixel size can contribute to appropriately grasp a damaged situation.

Since one object of image acquiring at the usual time is to update a reference image for the difference process (for example, to remove seasonal changes of plants), images are acquired around once every three month to six months. It is preferred that the difference process be performed with images acquired in the same season if possible. This is because season by season changes of features such as vegetation are prevented from being mistakenly detected. The usual time is changed to the emergency countermeasure time, for example, when the local government declares occurrence of a disaster.

Instead, the difference process may be performed between images obtained at the usual time, occurrence of a disaster may be detected from the result, and then the usual time may be changed to the emergency countermeasure time. In this case, since the number of images acquired increases, the cost rises. However, when image acquiring objects are limited to areas that are prone to disasters in particular seasons or areas to be intensively monitored (volcanoes, central areas of urban functions, and so forth), damaged areas or damaged situations can be grasped at low costs with higher accuracies. In addition, at this point, the foregoing threshold that is used to analyze data at the foregoing usual time may be set up according to information about the recovering and rebuilding progress at the foregoing recovering and rebuilding time. For example, if an image acquiring object requires time to recover and rebuild, the threshold can be changed so as to early detect occurrence of a disaster after the recovery (at the usual time).

Next, an example in which information about a threshold grasped by periodical image acquiring at the usual time is reflected to a parameter at the emergency countermeasure time will be described.

For example, a change amount of a characteristic value when a building collapsed is pre-registered as a threshold with which collapses of buildings can be detected to the threshold database. In other words, a change amount of a characteristic value when a predetermined building collapsed is detected from past radar image data, the change amount is correlated with additional information of the building, and then the result is registered as a threshold to the threshold database. If the change amount of the characteristic value when the building collapsed is correlated with a pixel size and the result is registered, the size of pixels to be processed can be selected as well as the threshold of the change amount of the characteristic value. As a result, by selecting an optimum threshold corresponding to a purpose (for example, to detect only collapsed buildings) at the emergency countermeasure time, the desired damaged situation can be early detected.

Instead, information about an object area grasped by the periodic image acquiring at the usual time can be reflected to a parameter for the emergency countermeasure time. For example, if a particular land use that is not prone to landslide disasters is used in an image acquiring object area, a threshold with which landslide disasters are detected is changed. In this case, a parameter can be set up corresponding to the characteristic of the ground surface and an accurate damaged situation can be grasped.

Next, an example in which information about an object area grasped by periodic image acquiring at the usual time is reflected to a parameter for the recovering and rebuilding time will be described.

For example, a method of pre-registering knowledge of a change amount of a characteristic value when a bare land was prepared for a building such as a house to the threshold database may be contemplated. In other words, a change amount of a characteristic value when a house was built on a bare land is detected from past radar image data, the change amount is correlated with additional information of the house, and the result is registered as a threshold to the threshold database. If the change amount of the characteristic value when the house was built is correlated with a pixel size and the result is registered, the size of pixels to be processed can be selected as well as the threshold of the change amount like the foregoing example. As a result, by selecting an optimum threshold corresponding to a purpose (for example, to detect a portion where bare lands were changed to houses) at the recovering and rebuilding time, the progress of a desired rebuilding plan can be checked.

In addition to checking for the progress of the rebuilding plan, this method can be used to mitigate secondary disasters. For example, based on information that denotes that an image of radar image data has a particular topographic characteristic and the area has a particular land cover, countermeasures against such as landslide and sediment disasters can be taken.

Figure 4:
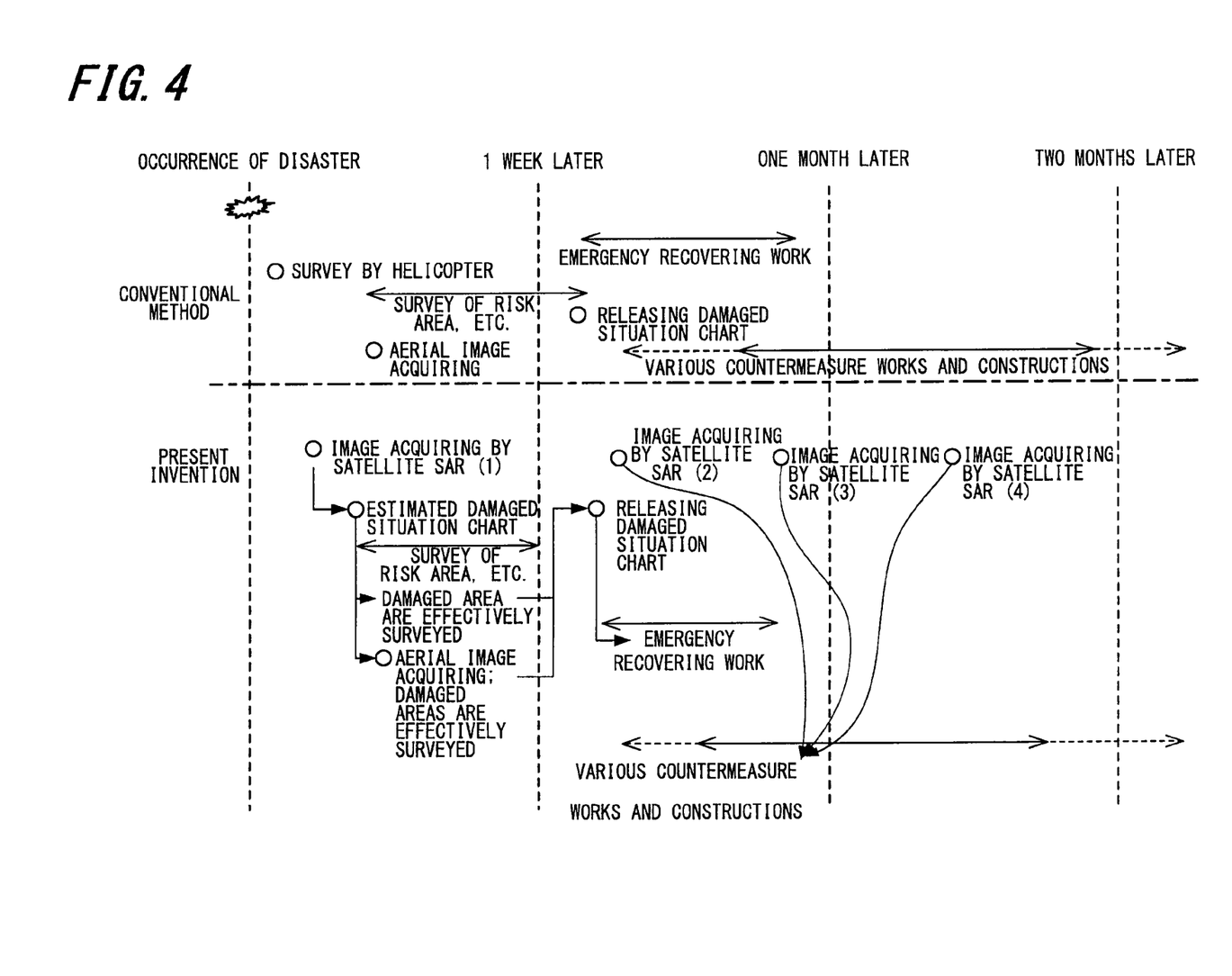
FIG. 4 is a schematic diagram showing an example of image acquiring planning by a satellite SAR according to this embodiment of the present invention.

Next, with reference to FIG. 4, a specific example of an image acquiring plan made by the disaster countermeasure support system according to this embodiment using satellites SAR after occurrence of a disaster will be described.

As described above, as an example of the conventional method, after occurrence of a disaster, while emergency disaster countermeasures are taken against the disaster under the direction of specialists of the central government and relevant organizations as well as a staff of the local government, the damaged situation is grasped, for example, by aerial photograph acquiring using helicopters and airplanes, investigating hazard areas using site survey, and so forth. Thereafter, for example, one week later, a damaged situation chart is released. Thereafter or along with the foregoing, an emergency recovering work, various kinds of recovering and rebuilding works, and so forth are conducted.

In the disaster countermeasure support system according to this embodiment, after occurrence of a disaster, initial image acquiring is conducted using satellites SAR as early as possible. For example, when an image acquiring object is acquired from any of a plurality of orbits of satellites before the orbit returning day of a particular satellite comes, the number of days necessary for acquiring the image acquiring object can be decreased from the number of orbit returning days. In this case, it is likely that the accuracy of an estimated damaged area obtained by the difference process for different orbits deteriorates. With a sacrifice of the accuracy, the early grasping of an overview of the damaged situation is prioritized. Thereafter, second, third, and fourth image acquiring may be performed when satellites circle suitable orbits if necessary.

Figure 5:
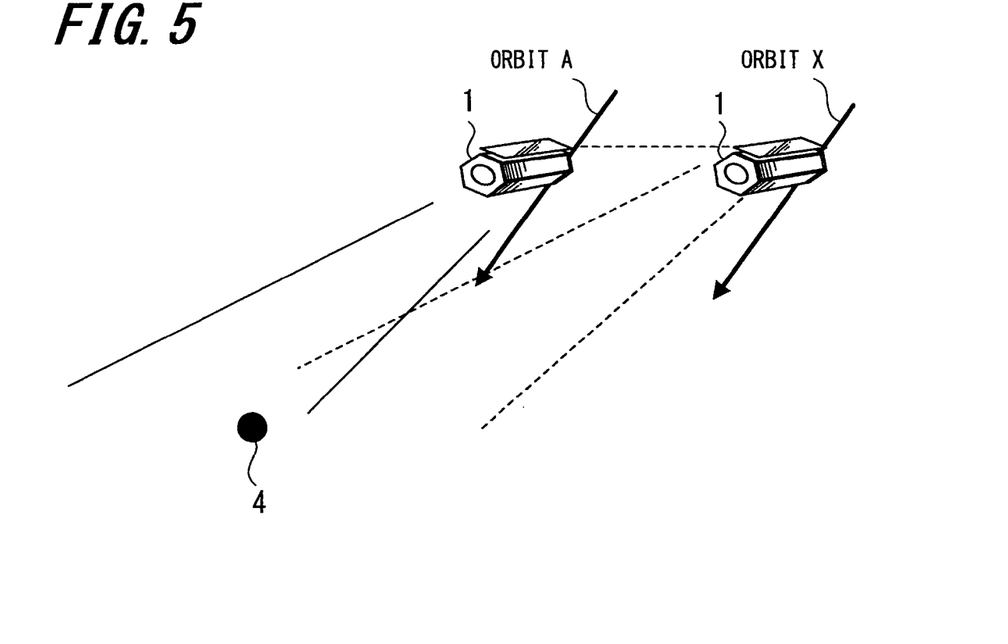
FIG. 5 is a schematic diagram describing image acquiring from a plurality of orbits according to this embodiment of the present invention.

FIG. 5 shows an example of image acquiring from a plurality of orbits. This example shows that an image of an image acquiring object 4 is acquired from a plurality of orbits (orbit A to orbit X). When an image of an area is acquired by a satellite SAR whose incidence angle can be changed, there may be a plurality of orbits from which images of the area can be acquired. Thus, after an image of a predetermined area is acquired from an orbit A, an image of the same area can be acquired from another orbit X that the satellite SAR passes before it returns. In this case, radar image data obtained from different orbits may be differentiated.

By comparing the acquired image data with data that have been stored at the usual time, an estimated damaged situation chart can be quickly created and provided to relevant organizations such as the local government. Thus, a seriously damaged area can be identified. Since an area to be surveyed in more details by aerial photograph acquiring or the like becomes clear, surveys including field surveys of hazard areas can be conducted efficiently. Since a pre-damaged situation has been grasped by periodical monitoring at the usual time, by comparing it with an image acquired after occurrence of a disaster, damaged areas can be quickly grasped.

Thereafter, for example, one week later, the local government and so forth creates and releases a damaged situation chart in which detailed information of a damaged situation obtained by a field survey, aerial photograph acquiring, and so forth has been reflected to the foregoing estimated damaged situation chart. Since the damaged situation chart has been created by conducting an effective survey based on the estimated damaged situation chart, an emergency restoring work can be adequately conducted and it can be expected that the recovering and rebuilding work can be qualitatively improved under a proper staff deployment. In addition, since communities isolated by collapsed roads and so forth can be estimated, it can be expected that human damages can be mitigated by supplying food and so forth and evacuating people from the isolated communities using helicopter.

In addition, at the recovering and rebuilding time, for example, one or two month after occurrence of a disaster, since an overview of the disaster has been grasped, the recovering and rebuilding work is effectively conducted for areas to be handled with priority such as those to be emergently handled.

In this period, images can be periodically acquired by the satellites SAR. Since images can be periodically acquired, even at the recovering and rebuilding time, the recovering situation and hazard areas prone to occurrence of secondary disasters are monitored. Thus, an effect of prevention against secondary disasters can be expected. In addition, by periodically acquiring images, plans of various countermeasure works and constructions, and so forth performed for recovering and rebuilding can be reviewed according to their progresses.

According to the above-described embodiment, when images of the ground surface are acquired at the usual time before occurrence of a disaster using a satellite that mounts a synthetic aperture radar (SAR), information that allows for mitigation against disasters can be obtained.

In addition, by periodically acquiring images after occurrence of a disaster, since changes of the ground surface can be successively grasped, they can help to prepare recovering and rebuilding plans and prevent secondary disaster from occurring.

In the foregoing embodiment, before occurrence of a disaster, an image of the entire object area is acquired by a synthetic aperture radar as a radar device mounted on a satellite. This is because it is difficult to estimate at what part of an object area will be damaged upon occurrence of a disaster. Thus, it is necessary to acquire images of a wide area in advance. However, if images are acquired a plurality of times every year, the image acquiring cost and work are required and there are many images that are not used.

Thus, a method of pseudo-creating an image that is acquired by a synthetic aperture radar (SAR image) using three-dimensional geographical information data (for example, geographical model (DSM), building polygon data, and so forth) obtained by a three-dimensional geographic information system (3DGIS) owned by individual local governments, private companies, and so forth or dielectric parameters of respective features and using this image as a reference image to support disaster countermeasures is proposed.

Figure 6:
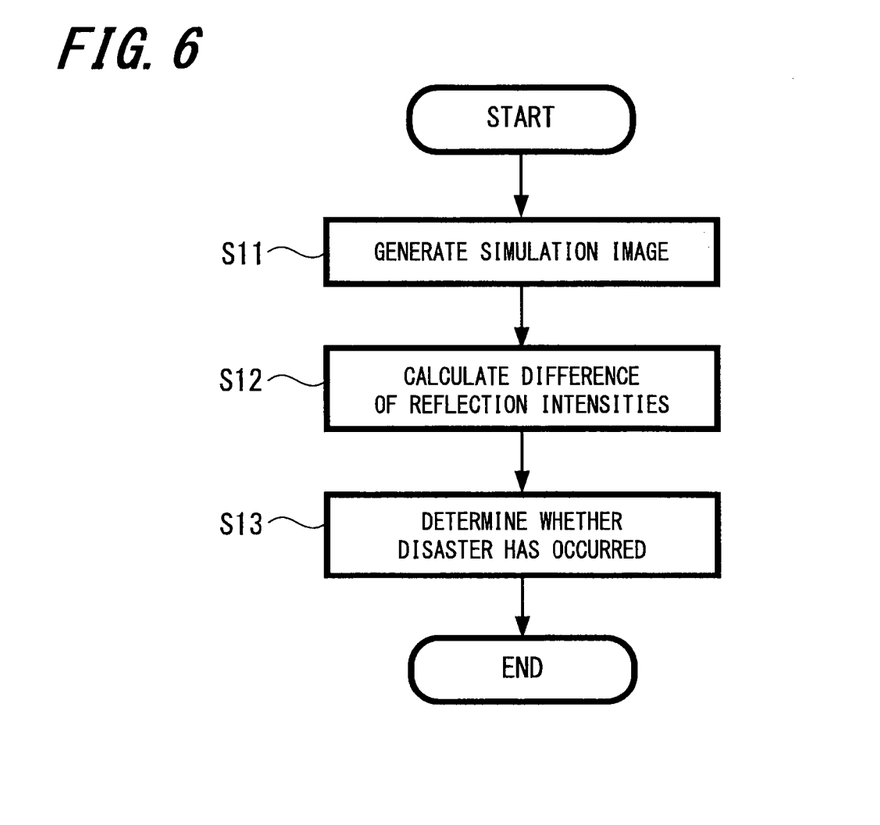
FIG. 6 is a flowchart showing a change detection process according to another embodiment of the present invention.

Next, with referenced to FIG. 6, an embodiment in the case that a pseudo-created SAR image (hereinafter referred to "simulation image") is used for a disaster countermeasure support will be described. Since a technique of creating a pseudo-SAR image using three-dimensional geographical information data and a technique of comparing a pseudo SAR image with an SAR image obtained by image acquiring are known, they will be briefly described in the following.

In the above-described embodiment, using a synthetic aperture radar mounted on a satellite as a flying object, it is identified (determined) whether or not characteristics of a post-disaster two-dimensional radar image (SAR image) containing features that change depending on flying directions (orbits) and so forth of the satellite match those of a pseudo SAR image pre-obtained at the usual time. In this identification method, it is determined whether or not a reflection intensity of an SAR image obtained after occurrence of a disaster matches that of a simulation image. Instead, in the direction where radar waves of the synthetic aperture radar are irradiated to the image acquiring object area, a histogram may be created by projecting a reflection intensity distribution of the radar waves and then it may be determined whether or not a post-projected reflection intensity distribution matches characteristics of SAR images generated in assumed radar irradiation directions at the usual time. At this point, in this embodiment, a simulation image (reference image) is generated from three-dimensional geographical information data or the like and it is identified whether or not characteristics of an SAR image acquired after occurrence of the disaster match those of the simulation image. In this embodiment, although a surface model (DSM) is used as three-dimensional geographical information data or the like on which a simulation image is based, the present invention is not limited to such an example.

First, a process of creating a simulation image from an existing surface model managed by the local government or the like at the usual time will be described. With an existing surface model (DSM) prepared, reflection patterns in individual radar irradiation directions (for example, at intervals of 10 degrees) of the synthetic aperture radar are generated by a data analysis device and then the generated reflection patterns are stored in storage means such as a radar image database. A radar irradiation direction can be restricted depending on an image acquiring timing on an orbit of the satellite SAR unlike an airplane SAR. A (two-dimensional) SAR image obtained by irradiating the radar is pattern-matched with a database image (simulation image). If necessary, a comparison object portion may be extracted from the SAR image and the extracted portion may be pattern-matched with the simulation image. It is not always necessary to pre-generate simulation images as a database. Instead, simulation images (reference images) may be generated from surface models corresponding to radar irradiation directions of SAR images (comparison images) really obtained from image acquiring after occurrence of a disaster.

Next, with reference to a flowchart shown in FIG. 6, the difference process for a simulation image and an SAR image obtained by image acquiring will be described. Based on the radar irradiation direction of the SAR image actually obtained by image acquiring, a pattern of radar reflection points (simulation image) of a surface model is synthesized by calculations. A simulation image generated in a radar irradiation direction closest to that of the SAR image actually obtained by image acquiring is selected based on the radar irradiation direction of the SAR image actually obtained (at step S11). If there is no simulation image in the radar irradiation direction of the SAR image actually obtained, a simulation image in the radar irradiation direction adjacent to the radar irradiation direction of the SAR image actually obtained may be used. Instead, a simulation image to be referred may be generated by interpolating simulation images generated in radar irradiation directions adjacent to the radar irradiation direction of the SAR image actually obtained and they may be compared. Thereafter, the difference between the reflection intensity of the SAR image and that of the simulation image is obtained by a difference calculation section (at step S12).

If the calculation result of the difference calculation section at step S12 denotes that the value, for example, of the reflection intensity difference is equal to or smaller than a predetermined threshold, it is determined that the SAR image (object area) match the simulation image and thereby no disaster has occurred. In contrast, if the value of the reflection intensity difference is larger than the predetermined threshold, it is determined that a disaster has occurred in the object area in the SAR image (at step S13). The determination of whether or not a disaster has occurred may be executed by the change detection section or a control section such as a CPU (Central Processing Unit) (not shown).

Thus, calculations of characteristic amounts are not required and a change of images at the usual time and after occurrence of a disaster, namely an area where a disaster has occurred can be quickly identified. In other words, by an analysis process for a simulation image (pseudo SAR image) as a reference image based on three-dimensional geographic information data (surface model or the like) and an SAR image obtained after occurrence of a disaster, a damaged area can be extracted.

In this case, since existing three-dimensional geographic information data (surface model or the like) is used, it is not necessary to periodically acquire reference images. Since image acquiring using a satellite mounting a synthetic aperture radar is performed after occurrence of a disaster, the cost burden becomes low, resulting in reducing the burden for local governments, commercial companies, and so forth. In addition, since simulations can be performed using simulation images in various conditions, simulation images can be generated in a condition close to that of image acquiring after occurrence of a disaster and thereby it can be expected that the accuracy of extracting a damaged area is increased in the analysis process. In addition, it can be expected that three-dimensional geographic information data and so forth owned by the local governments can be effectively used and integrated. Moreover, with materials from which simulation images were generated, derivative products (additional data) such as basic data with which a hazard map is prepared can be created.

It should be noted that the present invention is not limited to the foregoing individual embodiments. Instead, without departing from the scope of the present invention, various modifications and changes of the embodiments can be made.

In this specification, steps described in a program recorded on a record medium include processes that are not always sequentially executed, but executed in parallel or individually as well as those sequentially executed in the described order.

DESCRIPTION OF CITED REFERENCE NUMERALS

1 . . . satellite SAR, 2 . . . data analysis center, 3 . . . administrative organ, 4 . . . ground surface (image acquiring object), 11 . . . surface model, 12 . . . ground displacement amount, 13 . . . change extraction chart, 14, 15 . . . estimated damaged situation chart

The invention claimed is:
1. A disaster countermeasure support method of causing a radar device mounted on an artificial satellite having a predetermined number of orbit returning days to acquire radar image data of an image acquiring object over a period including an emergency countermeasure time after occurrence of a disaster and a recovering and rebuilding time and causing a data analysis device to use the radar image data obtained as a result of image acquiring to provide desired information, comprising:

causing the radar device to acquire an image of the image acquiring object from one of a plurality of orbits of the artificial satellite at an emergency countermeasure time after the occurrence of the disaster in a fewer number of days than the predetermined number of orbit returning days, and to obtain radar image data thereof;

causing the data analysis device to receive the radar image data acquired at the emergency countermeasure time after the occurrence of the disaster from the radar device;

causing the data analysis device to extract a change region from a difference of image data containing the image acquiring object and pre-generated at a usual time before the occurrence of the disaster and the radar image data acquired at the emergency countermeasure time after the occurrence of the disaster, and to create a first change extraction chart at the emergency countermeasure time from the extracted change region;

causing the radar device to periodically obtain periodic radar image data of the image acquiring object after obtaining the radar image data acquired at the emergency countermeasure time after the occurrence of the disaster;

causing the data analysis device to obtain periodic radar image data periodically acquired after the occurrence of the disaster from the radar device; and     causing the data analysis device to extract a change region from a difference of the radar image data acquired at the emergency countermeasure time after the occurrence of the disaster and the periodic radar image data periodically acquired after the occurrence of the disaster, and to create a change extraction chart at the recovering and rebuilding time from the extracted change region, wherein     the creating the change extraction chart at the emergency countermeasure time is performed by causing the data analysis device to extract a pixel or a set of pixels for which the difference of the two image data satisfies a predetermined first threshold as the change region, and to create the change extraction chart from the extracted change region,     the first threshold used to analyze data at the emergency countermeasure time is set up according to information about the image acquiring object, the information being obtained by analyzing the image data pre-generated at the usual time before the occurrence of the disaster,     the creating the change extraction chart at the recovering and rebuilding time is performed by causing the data analysis device to extract a pixel or a set of pixels for which the difference of the two image data satisfies a predetermined second threshold as the change region and create the change extraction chart from the extracted change region, and     the second threshold used to analyze data at the recovering and rebuilding time is set up according to information about the image acquiring object, the information being obtained by analyzing the image data pre-generated at the usual time.

2. The disaster countermeasure support method as set forth in claim 1, further comprising:

causing the radar device mounted on the artificial satellite to acquire images of the image acquiring object at the usual time before the occurrence of the disaster as well as at the emergency countermeasure time after the occurrence of the disaster and at the recovering and rebuilding time, the radar device to periodically obtain radar image data of the image acquiring object at the usual time before the occurrence of the disaster;

causing the data analysis device to receive the radar image data acquired at the usual time before the occurrence of the disaster from the radar device; and     causing the data analysis device to extract a change region from a difference of the radar image data acquired at the usual time before the occurrence of the disaster and the radar image data acquired at the emergency countermeasure time after the occurrence of the disaster and create a second change extraction chart at the emergency countermeasure time from the extracted change region.

3. The disaster countermeasure support method as set forth in claim 2, further comprising:

causing the data analysis device to create data of at least one of a surface model, a ground displacement amount, and a change extraction chart at the usual time before the occurrence of the disaster from the image data including the image acquiring object that have been periodically obtained at the usual time before the occurrence of the disaster.

4. The disaster countermeasure support method as set forth in claim 3, wherein     the creating the change extraction chart at the usual time before the occurrence of the disaster is performed by causing the data analysis device to extract a pixel or a set of pixels for which the difference of two image data including the image acquiring object that have been periodically obtained at the usual time before the occurrence of the disaster satisfies a predetermined third threshold as the change region and create the change extraction chart from the extracted change region.

5. The disaster countermeasure support method as set forth in claim 4, wherein     the third threshold used to analyze data at the usual time before the occurrence of the disaster is set up according to information about progress of recovering and rebuilding at the recovering and rebuilding time.

6. The disaster countermeasure support method as set forth in claims 1, 2, 3, 4, or 5, wherein     the radar device is a synthetic aperture radar.

7. A disaster countermeasure support method of causing a radar device mounted on an artificial satellite having a predetermined number of orbit returning days to acquire radar image data of an image acquiring object over a period including an emergency countermeasure time after occurrence of a disaster and a recovering and rebuilding time and causing a data analysis device to use the radar image data obtained as a result of image acquiring to provide desired information, comprising:

causing the radar device to acquire an image of the image acquiring object from one of a plurality of orbits of the artificial satellite at an emergency countermeasure time after the occurrence of the disaster in a fewer number of days than the predetermined number of orbit returning days, and obtain radar image data thereof;

causing the data analysis device to receive the radar image data acquired at the emergency countermeasure time after the occurrence of the disaster from the radar device;

causing the data analysis device to extract a change region from a difference of image data containing the image acquiring object and pseudo-created at a usual time before the occurrence of the disaster and the radar image data acquired at the emergency countermeasure time after the occurrence of the disaster, and to create a change extraction chart at the emergency countermeasure time from the extracted change region;

causing the radar device to periodically obtain radar image data of the image acquiring object after obtaining the radar image data acquired at the emergency countermeasure time after the occurrence of the disaster;

causing the data analysis device to obtain the radar image data periodically acquired after the occurrence of the disaster from the radar device; and causing the data analysis device to extract a change region from a difference of the radar image data acquired at the emergency countermeasure after the occurrence of the disaster and the radar image data periodically acquired after the occurrence of the disaster, and to create a change extraction chart at the recovering and rebuilding time from the extracted change region.

8. The disaster countermeasure support method as set forth in claim 7, wherein
the radar device is a synthetic aperture radar.

* * * * *